Sept. 19, 1939.  C. E. WILLIAMS ET AL  2,173,191

COMBUSTIBLE MIXTURE REGULATING MECHANISM

Filed Aug. 24, 1934  2 Sheets-Sheet 1

Inventors
Charles E. Williams &
William E. Burnett

By Blackmore, Spence & Flint
Attorneys

Sept. 19, 1939.   C. E. WILLIAMS ET AL   2,173,191
COMBUSTIBLE MIXTURE REGULATING MECHANISM
Filed Aug. 24, 1934   2 Sheets-Sheet 2
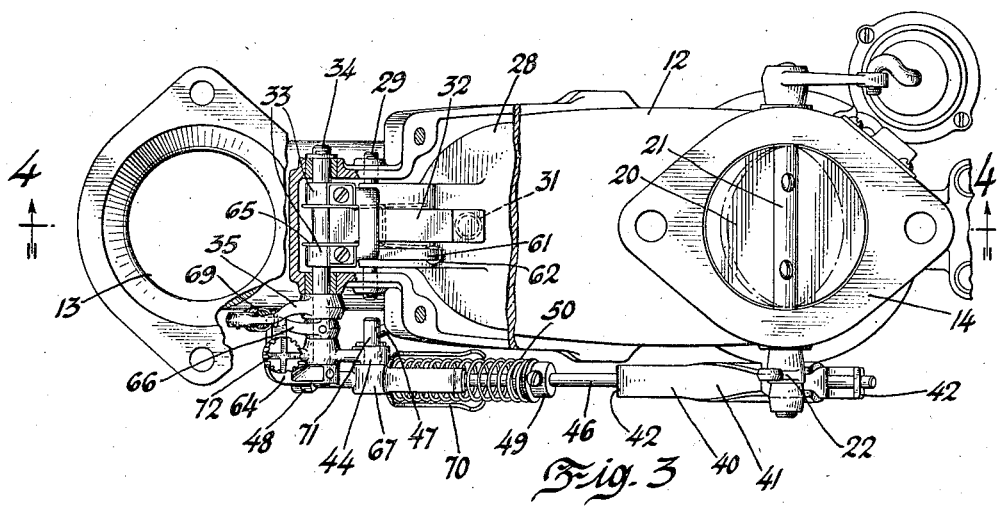
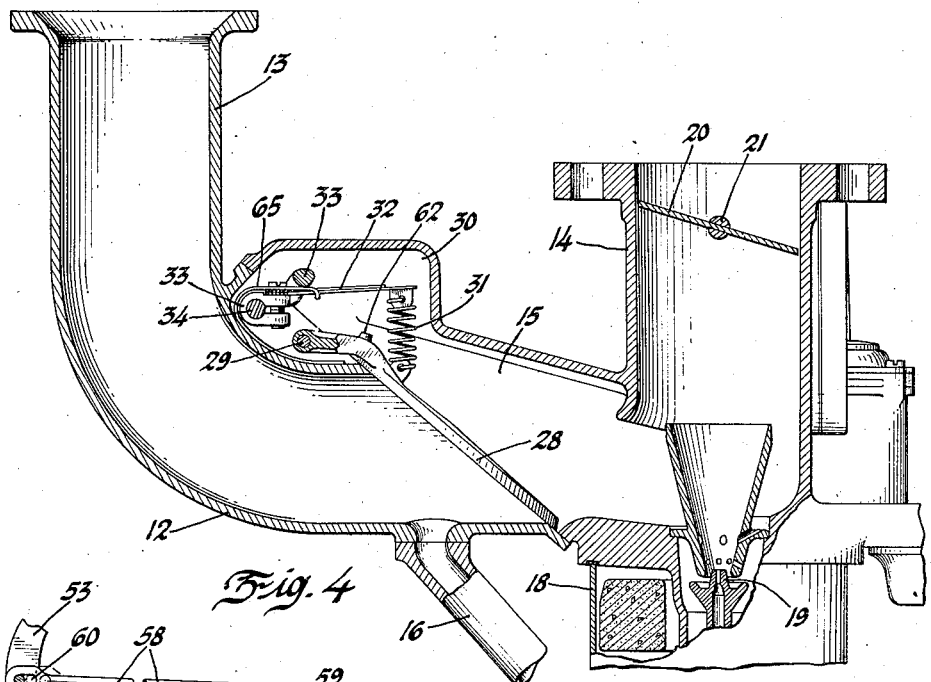
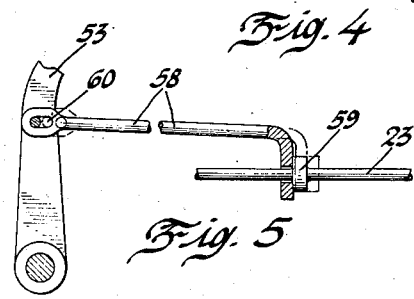
Inventors
Charles E. Williams &
William E. Burnett Patented Sept. 19, 1939

2,173,191

UNITED STATES PATENT OFFICE 2,173,191

COMBUSTIBLE MIXTURE REGULATING MECHANISM

Charles E. Williams and William E. Burnett, Detroit, Mich., assignors to General Motors Corporation, Detroit, Mich., a corporation of Delaware Application August 24, 1934, Serial No. 741,234

11 Claims. (Cl. 261—39)

The principal object of this invention is to provide mechanism for facilitating the starting of an internal combustion engine and insuring proper and continuous operation thereof under all speed, load and temperature conditions.

To attain the desired objective, we provide means for insuring that the combustible mixture supplied to the cylinders of the engine will at all times and under all conditions contain the optimum proportions of fuel and air and, in conjunction therewith, means for insuring that the engine will receive a sufficient supply of this mixture under all starting and running conditions.

For a better understanding of the nature and objects of our invention, reference is made to the following specification in which there is described the preferred embodiment of our invention which is illustrated in the accompanying drawings.

In the accompanying drawings:

Figure 3 is a top plan view, with parts broken away and in section, of the carburetor illustrated in the preceding figures.

Figure 4 is a view, mainly in section on the line 4—4 of Figure 3, of the carburetor illustrated in the preceding figures.

Figure 5 is an enlarged fragmentary view of the starter-throttle interconnection illustrated in Figure 1.

Figure 1:
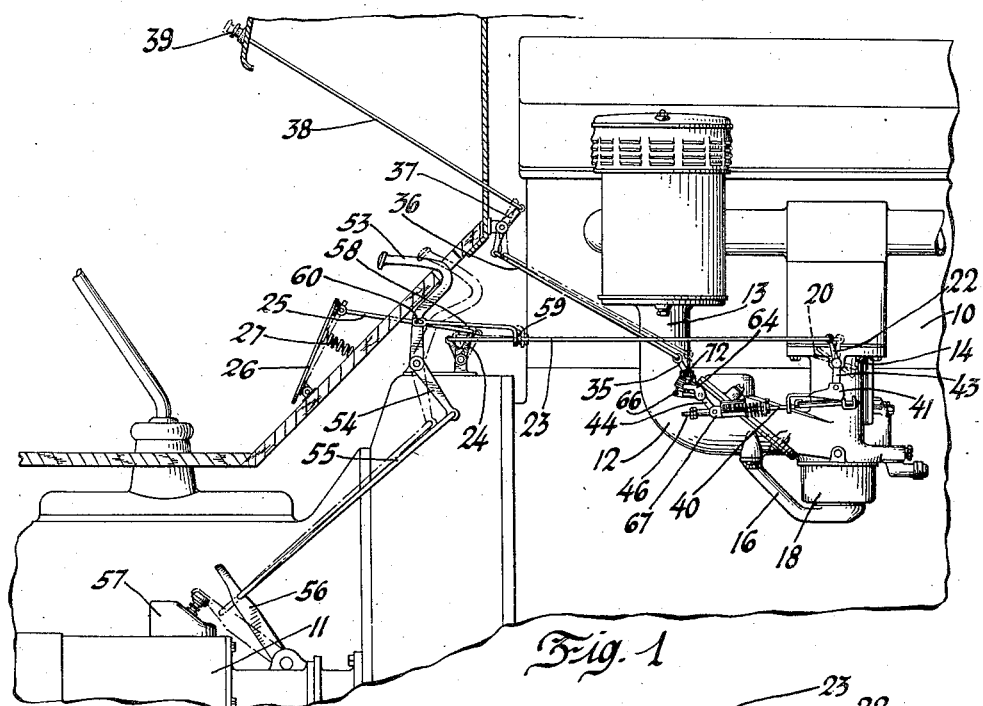
Figure 1 shows mechanism in which our invention is embodied installed on the internal combustion propelling engine of an automotive vehicle.

In the automotive vehicle illustrated in the drawing, there is installed a propelling engine 10 which is adapted to be cranked by an electric motor 11.

To supply a combustible mixture of fuel and air to the cylinders of the engine 10, there is provided a carburetor 12 into which air is drawn through the air intake tube 13 and from which a combustible mixture of fuel and air is withdrawn through the riser 14 by the suction of the engine. The intake tube and the riser are connected by a secondary air passage 15 and a primary air and mixture passage 16. Into the air which flows through the primary air and mixture passage 16, fuel from the float bowl 18 is adapted to be discharged through the nozzle 19 to form a primary mixture which passes into the riser 14 and is there mixed with the air which enters the riser through the secondary air passage 15 to form a combustible mixture which contains the desired proportions of fuel and air.

To control the volume of combustible mixture supplied to the cylinders of the engine, there is provided in the riser 14 a throttle valve 20 of the butterfly type which is mounted on a shaft 21 which is journalled in the walls of the riser. To one end of the shaft 21, there is fixed an arm 22 which, through a rod 23, a bell crank arm 22 and a rod 25, is connected to the accelerator pedal 26 which is biased to the position in which the throttle valve is closed by a spring 27.

To control the volume of air which enters the secondary air passage 15, and consequently, the ratio of fuel to air in the combustible mixture which is supplied to the cylinders of the engine, there is provided in the passage 13—15—14, between the junctions of the passage 16 therewith, a valve 28 which is pivotally mounted on a shaft 29 which is located in a recess 30. The valve 28 is connected, through a coil spring 31, to one end of a bimetallic strip 32 which is so constructed that the end which is connected to the spring moves downwardly when its temperature decreases and upwardly when its temperature increases. The other end of the bimetallic strip 32 is secured to a bracket 33 which is clamped onto a shaft 34 which is journalled in the walls of the recess 30 and is biased in a counterclockwise direction, as viewed in Figures 1, 2 and 4, by a spring 65. On the bracket 33, there is also formed an arm 61 which is adapted to engage a boss 62, on the valve 28.

On an end of the shaft 34, without the recess 30, there are mounted two arms 35 and 66, a double-armed lever 44 and an arm 64 which is curved so that its free end overlies the arm 66 and one of the arms of the lever 44. The arm 64 is fixed on the shaft 34 and the arms 35 and 66 and the lever 44 are so mounted on the shaft that they can rotate with respect to it. The arms 35 and 66 are interconnected by a coil spring 69 and the arm 35 is connected to the choke valve operating knob 39 through a rod 36, a lever 37 and a rod 38.

Figure 2:
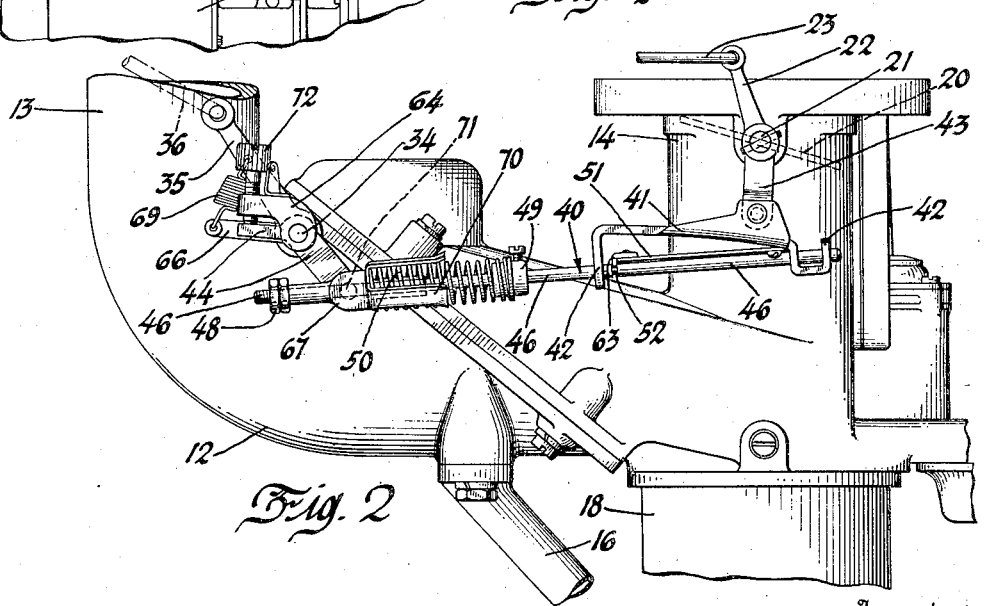
Figure 2 is a side elevation, with parts broken away and in section, of a carburetor of the engine shown in Figure 1.

The valve 28 and the throttle valve 20 are operatively interconnected, under conditions hereinafter described, by a linkage which is designated on the drawings by the reference character 40. This linkage includes what may be described as an inverted U-shaped frame 41, an element 67 and a rod 46 which extends through the legs 42 of the frame and through the element 67. The bight of the frame 41 is, adjacent one of the legs 42, pivotally connected to an arm 43 which is fixed to the throttle valve shaft 21. On the element 67, there is provided a pivot 71 which extends through the arm of the lever 44 which does not underlie the free end of the arm 64 and is adapted to engage a stop 47 on the intake tube 13 to limit rotation of the lever 44 in a counterclockwise direction, as viewed in Figures 1 and 2. Movement of the rod 46 to the right with respect to the element 67 when the parts are viewed as they are shown in Figures 1, 2 and 4 is limited by nuts 48 on the rod 46. Movement of the rod 46 to the left with respect to the element 67 when the parts are viewed as they are shown in Figures 1, 2 and 4 compresses a spring 50 which surrounds the portion of the rod 46 between the end of a guide 70 which is carried by the element 67 and a collar 49 which is fixed on the rod 46. To the frame 41, adjacent the point at which it is connected to the arm 43, there is fixed one end of a bimetallic strip 51 which is so constructed that its free end which carries a lug 63 which is adapted to engage in a groove 52 in the rod 46, moves toward the rod when its temperature decreases and away from the rod when its temperature increases.

To put into operation the electric motor 11 which cranks the engine 10, there is provided a pedal 53 which, through an arm 54, a rod 55 and a lever 56, operates the switch mechanism 57 which controls the motor. Between the pedal 53 and a rod 58, which is adapted to engage a collar 59 which is fixed on the rod 23 and open the throttle valve 20 to a predetermined extent when the pedal is depressed sufficiently to close the switch 57, there is a lost motion connection 60 of the pin and slot type.

To start an engine which is equipped with the mechanism hereinbefore described and illustrated in the drawings, the operator pulls outwardly on the knob 39 and depresses the pedal 53.

When the knob 39 is pulled outwardly, the arm 35 is, through the rod 38, the lever 37 and the rod 36, rotated in a clockwise direction, as viewed in Figures 1, 2 and 4. This movement of the arm 35 extends the spring 69 and through it rotates the arm 66 in the same direction as the arm 35. This movement of the arm 66 brings it into engagement with the overlying end of the arm 64 and through the latter rotates the shaft 34 in the same direction as the arms 35 and 66. This movement of the shaft 34 causes the bimetallic strip 32 to move toward the valve 28 and compress the spring 31 and, consequently, increases the resistance offered by the bimetallic strip 32 and the spring 31 to movement of the valve toward open position. The described movement of the shaft 34 also causes the arm 61 to move toward the boss 62 on the valve 28 and, if the knob 39 is pulled outwardly sufficiently, into engagement with it. When the arm 61 is in engagement with the boss 62 on the valve 28, movement of the valve toward open position is opposed by the spring 69 which is considerably stiffer than the spring 31.

When the pedal 53 is depressed, the throttle valve 20 is, through the rod 58, the rod 23 and the arm 22, partially opened, the switch 57 is, through the arm 54, the rod 55 and the lever 56, closed and the crank shaft of the engine is rotated by the motor 11.

By rotating the shaft 34 in a clockwise direction as viewed in Figures 1, 2 and 4, the operator insures that the combustible mixture which is to be supplied to the cylinders of the engine will contain the desired proportions of fuel and air and by partially opening the throttle valve 20, he insures that the engine will receive sufficient of this combustible mixture that it will start quickly and easily.

After the engine is started and is operating properly under its own power, the operator should push in the knob 39. When the knob 39 is pushed in and the engine is operating with the throttle valve opened about one-third or less, or with the throttle valve opened to a greater extent if the temperature of the engine exceeds a predetermined value, the proportion of fuel to air in the combustible mixture supplied to the cylinders of the engine is regulated by the bimetallic strip 32 through the spring 31 and the valve 28.

When the engine is operating under the conditions described in the next preceding paragraph, neither the position of the valve 28 nor the idling speed position of the throttle valve 20 is affected by the linkage 40. However, if when the engine is cold the throttle valve 20 is moved more than about one-third of the way from fully closed to fully opened position, the lug 63 on the bimetallic strip 51 will engage in the notch 52 in the rod 46. While the lug 63 is engaged in the notch 52, movement of the throttle valve toward fully opened position will, through the arm 43, move the rod 46 toward the left when the parts are viewed as they are shown in Figures 1, 2 and 3 and movement of the throttle valve toward fully closed position beyond its fast idling speed position, i. e., a position in which the engine will idle properly when it is cold, will be prevented by engagement of the pivot 71 of the element 67 with the stop 47. Movement of the rod 46 toward the left when the parts are viewed as they are shown in Figures 1, 2 and 3 compresses the spring 50 and through it moves the element 67 in the same direction as the rod 46 and rotates the lever 44 in a clockwise direction, as viewed in Figures 1 and 2. This movement of the lever 44 brings its arm which underlies the arm 64 into engagement with the adjusting screw 72 which extends through the arm 64 and through the latter rotates the shaft 34 in the same direction as the lever 44. From what has been said hereinbefore, it will be clear that this movement of the shaft 34 increases the resistance offered by the bimetallic strip 32 and the spring 31 to movement of the valve 28 toward open position and, if the throttle valve is opened sufficiently, the arm 61 will be moved into engagement with the boss 62 on the valve 28 and, thereafter, movement of the valve 28 toward open position will be opposed by the spring 50 which is considerably stiffer than the spring 31. From the foregoing, it will be clear that, when the engine is cold and the lug 63 is engaged in the notch 52, movement of the throttle valve toward fully opened position will cause an increase in the ratio of fuel to air in the combustible mixture supplied to the cylinders of the engine and, consequently, that the operation of the engine with the throttle valve more than about one-third fully opened when it is cold is improved by applying our invention to it.

When the temperature of the engine exceeds a predetermined value, the lug 63 on the bimetallic strip 51 moves out of the notch 52 in the rod 46, the rod 46 can slide freely in the openings in the arms 42 of the frame 41 and the position of the valve 28 is no longer mechanically affected by movement of the throttle valve. When this condition is attained and the hand-operated throttle valve operating lever or knob is moved to position to close the throttle valve, the spring 27 will move the throttle valve beyond its fast idling speed position to its normal idling speed position.

It is apparent, since upon rotation of the lever 44 in one direction its arm which underlies the arm 64 is moved away from the arm 64 and upon rotation of the lever 44 in the other direction the arm 64 is moved away from the arm 66, that movement of the throttle valve 20 will not be accompanied by the movement of the linkage 66—69—35—36—37—38—39. Because, upon rotation of the arm 35 in one direction the arm 64 will be moved away from the underlying arm of the lever 44 and upon rotation of the arm 35 in the other direction the arm 66 will be moved away from the overlying arm 64 manual adjustment of the valve 28 by means of the knob 39 will not affect the position of the throttle valve 20.

The screw 72 is provided so that the resistance offered by the bimetallic strip 32 and the spring 31 to movement of the valve 28 may be varied. The advantage of locating this screw in the choke valve operating linkage rather than on the body of the carburetor is that when it is located in the choke valve operating linkage adjustment of the screw changes the resistance offered by the bimetallic strip 32 and the spring 31 to movement of the choke valve throughout the range of movement of the choke valve operating mechanism and that no adjustment of the screw is necessary when the choke valve operating link is adjusted.

Although we have shown and described a preferred embodiment of our invention, it is to be understood that this has been done by way of example and not by way of limitation and that the scope of our invention is defined only by the appended claims.

We claim:

1. In a carburetor, a valve for regulating the entrance of air into the carburetor, a valve for controlling the passage of combustible mixture from the carburetor, resilient means interconnecting the valves so that movement of the second-mentioned valve toward its open position tends to move the first-mentioned valve toward its closed position, and a thermostat which renders the interconnection ineffective when the temperature exceeds a predetermined value.

2. In a carburetor, a valve for regulating the entrance of air into the carburetor, a valve for controlling the passage of combustible mixture from the carburetor, means including a thermostat interconnecting the mentioned valves so that movement of the second-mentioned valve toward its open position tends to closed the first-mentioned valve, and a thermostat which renders the interconnection ineffective when the temperature exceeds a predetermined value.

3. In a carburetor, a valve for regulating the entrance of air into the carburetor, a valve for controlling the passage of combustible mixture from the carburetor, means including two relatively slidable members interconnecting the mentioned valves, and means including a thermostat for preventing relative sliding movement of the two members.

4. In a carburetor, a valve for regulating the entrance of air into the carburetor, a valve for controlling the passage of combustible mixture from the carburetor, means for interconnecting the valves so that movement of the second-mentioned valve toward its open position tends to close the first-mentioned valve, a stop which may be engaged by the mentioned means to limit its movement and the movement of the second mentioned valve in the opposite direction, and a thermostat for rendering the interconnection ineffective.

5. In a carburetor, a valve for regulating the entrance of air into the carburetor, a spring for opposing movement of the valve toward its open position, a stiffer spring arranged in series with the first mentioned spring and so that it may apply a closing force to the valve, and means for applying the closing force of the stiffer spring to the valve.

6. In a carburetor, a valve for regulating the entrance of air into the carburetor arranged so that flow of air into the carburetor tends to open it, a valve for controlling the passage of combustible mixture from the carburetor, resilient means, including a thermostat, for opposing movement of the first mentioned valve toward its open position, and means interconnecting the valves so that movement of the second mentioned valve toward its open position may move the first mentioned valve toward its closed position.

7. The invention claimed in claim 6 plus a thermostat which renders the last mentioned means ineffective when the temperature exceeds a predetermined value.

8. In a carburetor, a valve for regulating the entrance of air into the carburetor, a valve for controlling the passage of combustible mixture from the carburetor, resilient means, including a thermostat, for opposing movement of the first mentioned valve toward its open position, a stiffer resilient means arranged so that it may apply a closing force to the first mentioned valve, means through which movement of the second mentioned valve toward its open position may cause the closing force of the stiffer resilient means to be applied to the first mentioned valve, and means which renders the last mentioned means ineffective when the temperature exceeds a predetermined value.

9. In a carburetor, a valve for regulating the entrance of air into the carburetor, a valve for controlling the passage of combustible mixture from the carburetor, a spring for opposing movement of the first mentioned valve toward its open position, means through which movement of the second mentioned valve toward its open position may cause a closing force to be applied to the first mentioned valve, and means independent of the second mentioned valve for applying a closing force to the first mentioned valve.

10. In a carburetor, a valve for regulating the entrance of air into the carburetor, a valve for controlling the passage of combustible mixture from the carburetor, means, including two elements relatively movable within limits, interconnecting the specified valves and so arranged that movement of the second mentioned valve toward its open position may cause the first mentioned valve to move toward its closed position after but not before the second mentioned valve has been moved to a predetermined extent toward its open position, and a thermostat which renders the interconnection ineffective when the temperature exceeds a predetermined value.

11. In a carburetor, a valve for regulating the entrance of air into the carburetor so arranged that flow of air into the carburetor tends to open it, resilient yielding thermostatic means connected to the valve, a valve for controlling the passage of combustible mixture from the carburetor, means for transmitting movement of the second specified valve to the first specified valve so that the first specified valve may be moved toward its closed position when the second specified valve is moved toward its open position including a member connected to the second specified valve and a resilient yielding member which is stiffer than the resilient yielding thermostatic means connected to the first specified valve through the resilient yielding thermostatic means, the members being movable with respect to each other so that the movement transmitting means is ineffective to transmit movement of the second specified valve to the first specified valve when the temperature exceeds a predetermined value, a thermostat for preventing movement of the relatively movable members with respect to each other when the temperature is below the predetermined value so that when the temperature is below this value the first specified valve may be moved toward its closed position by movement of the second specified valve toward its open position, an abutment by which movement of the second specified member in the direction in which it tends to move when the first specified valve moves toward its open position is limited so that the resilient yielding thermostatic means may oppose movement of the first specified valve toward its open position and movement of the second specified valve toward its closed position will be limited when the temperature is below the predetermined value, and means for manually moving the first specified valve toward its closed position without affecting the movement transmitting means.

CHARLES E. WILLIAMS.
WM. E. BURNETT.